United States Patent [19]
Williams et al.

[11] Patent Number: 5,575,355
[45] Date of Patent: Nov. 19, 1996

[54] METHOD AND APPARATUS FOR APPLYING LUBRICANT TO A HYDRODYNAMIC BEARING

[75] Inventors: Carl D. Williams; Jackie Cordova; Richard E. Mills, all of Colorado Springs, Colo.

[73] Assignee: Quantum Corporation, Milpitas, Calif.

[21] Appl. No.: 626,880

[22] Filed: Apr. 3, 1996

Related U.S. Application Data

[62] Division of Ser. No. 495,822, Jun. 28, 1995, Pat. No. 5,524,728.

[51] Int. Cl.$^6$ .................................................... F16N 7/30
[52] U.S. Cl. .................... 184/55.1; 184/6.22; 184/6.23; 184/29; 184/109; 141/7; 141/65; 141/82; 198/500; 384/100
[58] Field of Search .................... 184/6.22, 6.23, 184/29, 31, 55.1, 55.2, 57, 104.1, 109; 384/100; 141/4, 5, 7, 65, 82; 198/500

[56] References Cited

U.S. PATENT DOCUMENTS

| | | | |
|---|---|---|---|
| 579,385 | 3/1897 | Dodge | 184/109 |
| 3,282,306 | 11/1966 | Greenhut | 141/7 |
| 4,066,869 | 1/1978 | Apaloo et al. | 184/6.22 |
| 4,795,275 | 1/1989 | Titcomb et al. | 384/107 |
| 5,067,528 | 11/1991 | Titcomb et al. | 141/4 |
| 5,112,142 | 5/1992 | Titcomb et al. | 384/107 |
| 5,240,090 | 8/1993 | Rumps | 184/6.22 |

Primary Examiner—Edward K. Look
Assistant Examiner—Christopher Verdier
Attorney, Agent, or Firm—David B. Harrison; John C. Chen

[57] ABSTRACT

A method, and associated apparatus, or applying fluid lubricant to hydrodynamic bearing. Clearance spaces of the bearing which are to be filled with the fluid lubricant are evacuated. The fluid lubricant is then applied to the clearance spaces. Once the fluid lubricant has been applied to the clearance spaces, or concurrent therewith, the clearance spaces are returned to ambient pressure levels. Any pockets of air, or other gas, trapped within the bearing are collapsed as the clearance spaces are returned to the ambient pressure levels. The method is amenable to a high volume, assembly line-like process wherein large numbers of bearings may be filled with the fluid lubricant in a short period of time. A conveyor conveys the bearings into a pool of fluid lubricant in a vacuum tank having a pressure level adjustable between an ambient pressure level and an evacuated pressure level, through the pool of fluid lubricant, beyond the pool, and out of the vacuum tank.

16 Claims, 4 Drawing Sheets

METHOD AND APPARATUS FOR APPLYING LUBRICANT TO A HYDRODYNAMIC BEARING

CROSS REFERENCE TO RELATED PATENTS

The present invention is a divisional of application Ser. No. 08/495,822, filed June. 28, 1995, now U.S. Pat. No. 5,524,728, which is related to the subject matter of U.S. Pat. Nos. 4,795,275 for "Hydrodynamic Bearing", issued Jan. 3, 1989; 5,067,528 for "Hydrodynamic Bearing", issued Nov. 26, 1991; and 5,112,142 for "Hydrodynamic Bearing", issued May 12, 1992. The patents are presently assigned to the Quantum Corporation of Milpitis, Calif., Assignee of the present invention. The patents are hereby specifically incorporated by reference herein.

BACKGROUND OF THE INVENTION

The present invention relates generally to hydrodynamic bearings. More particularly, the present invention relates to a method, and associated apparatus, for applying a fluid lubricant to a hydrodynamic bearing.

The fluid lubricant is applied to the bearing to fill clearance spaces separating moving parts of the bearing. When fluid lubricant is applied to the bearing to fill the clearance spaces according to the teachings of the present invention, problems associated with pockets of trapped air in the bearing are minimized. In particular, pockets of air trapped in the bearing during application of the fluid lubricant to the bearing are collapsed, and thermally-related expansion of the pockets of air, once collapsed, does not present problems during operation of the bearing.

Many types of bearings and bearing assemblies are commercially available for use in many different types of devices. Conventional radial bearings and conventional ball bearings are examples of types of bearings which are commercially available and widely utilized.

A disk drive assembly is exemplary of a device which utilizes bearings. A disk drive assembly is a computer mass storage device from which data may be read and/or to which such data may be written. Generally, a disk drive assembly includes one or more randomly-accessible rotating storage media, or disks, on which the data is encoded. An inner diameter of the disk is affixed to a hub which is rotationally coupled to a stationary spindle shaft by a pair of bearings, conventionally ball bearings. The pair of bearings is typically formed of an upper bearing and a lower bearing.

As disk drive assemblies increasingly are constructed to be of reduced heights, the length of the spindle shaft and the spacing between the upper and lower bearings must be reduced. That is to say, as the height of the disk drive assembly is reduced, a proportionately shorter spindle shaft must be accommodated within the disk drive assembly of the reduced height. As a shorter spindle shaft is required, the spacing between the bearings must correspondingly be reduced.

As the upper and lower ball bearings must be spaced apart by shorter distances and the concomitant trend towards smaller nonrepetitive runout (NRRO) and higher spin rates, continued use of conventional ball bearings increasingly becomes a problem. In particular, shorter spacing between the bearings results in reduced tilt stiffness and a reduced rocking mode frequency, either of which, if severe, can cause drive failure of the disk drive assembly. Additionally, lubricant film thicknesses associated with ball bearings are inherently very thin and little attenuation of surface defects and imperfections in the ball bearings is provided by the thin lubricant film. Large amounts of repetitive runout or repetitive path deviation traced out by the spin axis of the spindle bearing can result. Such runout and path deviation, if severe, can also cause damage to the disk drive assembly.

The aforementioned U.S. Pat. Nos. 4,795,275; 5,067,528, and 5,112,142 all disclose a hydrodynamic bearing. While not so limited, bearings similar to the bearings disclosed therein are of particular utility in overcoming the inherent disadvantages of conventional ball bearing-supported spindles utilized in a disk drive assembly.

The hydrodynamic bearing includes a lubricant film of a fluid lubricant applied to clearance spaces formed between sliding metal surfaces of the bearing. The lubricant film provides a high degree of viscous damping and, when used in substitution for conventional ball bearings in a disk drive assembly, permits increased tracking performance to be achieved by the disk drive assembly. Increased tracking performance is advantageous as increased drive track densities of a disk and, hence, increased storage capacities of a disk are permitted. Additionally, the lubricant film further serves to dampen external shock and vibration.

Typically, once a hydrodynamic bearing is assembled, a lubricant is then applied to fill the clearance spaces separating moving parts of the bearing. During application of the lubricant, pockets of air or other gasses existent in the bearing can become trapped in the bearing. For purposes of simplicity, the term "air" shall herein refer to any gaseous media. During operation of the bearing, heat is generated, and the thermal expansive properties of the air pockets cause the volumetric dimensions of the air pockets to increase responsive to the heat generation. Such increased volumetric dimensions of the air pockets can cause the lubricant to be pushed out of the bearing as a result of expansion of the air pockets. Therefore, care must be exercised to minimize the trapping of pockets of air in the bearing during application of the lubricant to the bearing.

It is with respect to these considerations and other background information relative to hydrodynamic bearings that the significant improvements of the present invention have evolved.

SUMMARY OF THE INVENTION

The present invention advantageously provides a method, and associated apparatus for implementing the method, of applying a fluid lubricant to a hydrodynamic bearing. Pockets of air trapped within the bearing during application of the fluid lubricant to bearing are collapsed into very small volumes.

The method and apparatus of the present invention permits the fluid lubricant to be applied to a large number of hydrodynamic bearings in a short period of time and is amenable to an assembly line-like process. Any pockets of air which become trapped within the bearing during application of the lubricant thereto, are collapsed, thereby to avoid problems associated with thermal expansion of air trapped in the bearing during operation of the bearing. Other problems associated with pockets of air retained in the bearing are additionally avoided. For instance, cavitation of bearing parts is avoided.

In accordance with the present invention, therefore, a method, and associated apparatus, for applying a fluid lubricant to a hydrodynamic bearing is disclosed. Clearance spaces of the hydrodynamic bearing separate bearing parts of the bearing and at least one pathway extends to an external surface of the bearing. Clearance space pressure levels of the clearance spaces are reduced to reduced pressure levels relative to the ambient pressure level. Then, the fluid lubricant is applied to the clearance spaces and the clearance space pressure levels are returned to levels above the reduced pressure levels.

A more complete appreciation of the present invention and the scope thereof can be obtained from the accompanying drawings which are briefly summarized below, the following detailed description of the presently preferred embodiments of the invention, and the appended claims.

DETAILED DESCRIPTION

Figure 1:
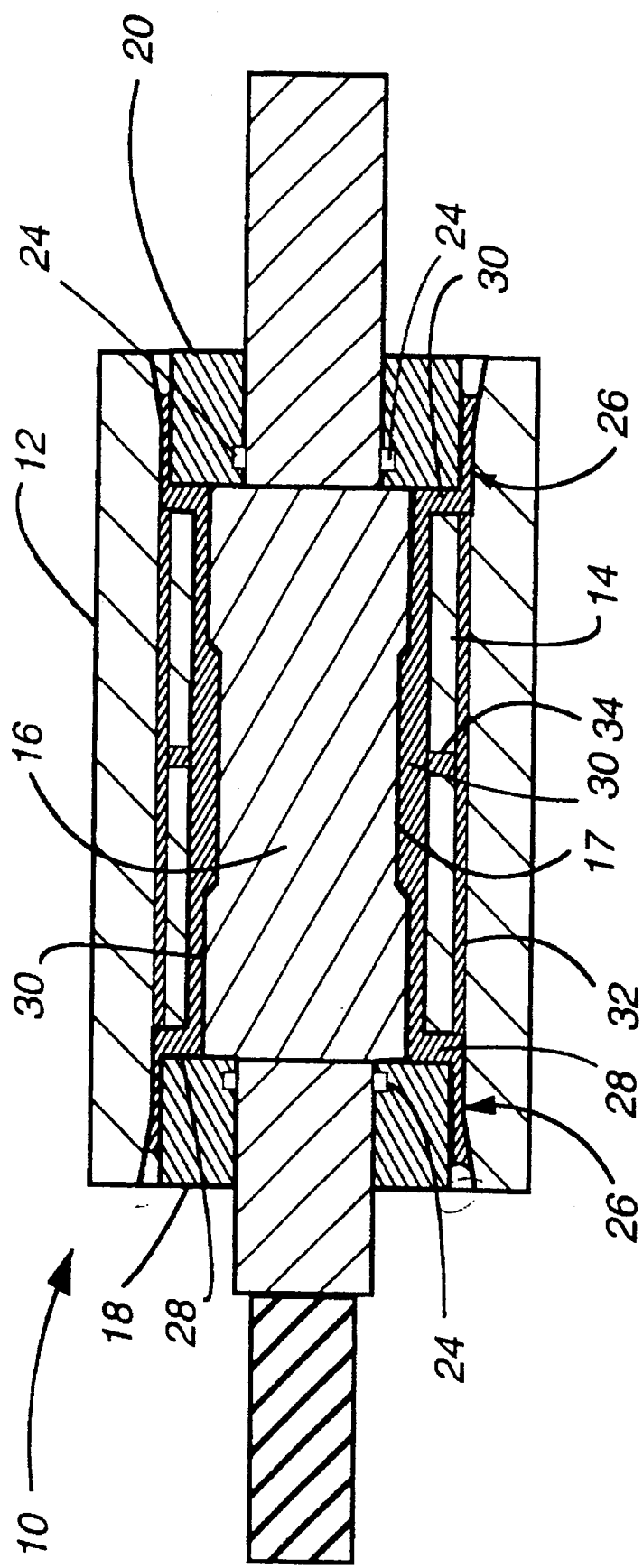
FIG. 1 is a sectional view of a hydrodynamic bearing exemplary of a bearing to which a fluid lubricant may be applied during operation of an embodiment of the present invention.

FIG. 1 illustrates a hydrodynamic bearing, shown generally at 10, exemplary of a bearing to which a fluid lubricant may be applied during operation of an embodiment of the present invention. It should be noted at the outset that the bearing 10 is merely an exemplary hydrodynamic bearing and that the teachings of the present invention can be utilized to apply fluid lubricant to many other constructions of hydrodynamic bearings.

The bearing 10 includes an outer sleeve 12. The outer sleeve 12 includes an inner portion 14 of a reduced inner diameter. A shaft 16 is positioned within the sleeve 12 and relative rotational movement between the shaft 16 and the sleeve 12 is permitted. The shaft 16 may be held in a stationary position and the outer sleeve 12 rotated. Alternately, the outer sleeve 12 may be held stationary and the shaft 16 rotated, or both the sleeve 12 and shaft 16 may be rotated, but at different rotation rates.

In the embodiment illustrated in FIG. 1, the shaft 16 further includes a recessed portion 17 defining, or separating, bearing shaft portions at opposing, axial side portions of the shaft.

Thrust plates 18 and 20 positioned at opposing, axial sides of the bearing 10 are affixed to the shaft 16, thereby to rotate together with the shaft or to be maintained in a stationary position with the shaft. Static seals 24, here O-ring seals, are positioned to form seals between the thrust plates 18 and 20 and the shaft 16. The seals 24 are operative to prevent lubricant leakage along the boundaries of the thrust plates 18 and 20 and the shaft 16.

Clearance spaces 26, 28, and 30 are formed between the sleeve 12 and the shaft 16 and thrust plates 18 and 20. The clearance spaces 26, 28, and 30 define separation distances separating the sleeve 12 and the shaft 16/thrust plate 18 and 20 combination. More particularly, the clearance space 26 is defined between the thrust plates 18 or 20 and the sleeve 12 and extends to the clearance space 28. The clearance space 28 is defined between inner side portions of the thrust plates 18 or 20 and end sides of the inner portion 14 of the sleeve 12 and extends to the clearance space 30. And, the clearance space 30 is defined between the inner portion of the sleeve 12 and the shaft 16. The clearance spaces 26, 28, and 30 are together in fluid communication, and together form a fluid path or pathway extending from an outer surface of the bearing 10 into the interior of the bearing. The clearance spaces are quite narrow. For instance, the clearance space 30 can be of a width of between 0.0002 and 0.001 inches, and the clearance space 28 can be of a width of between 0.0005 and 0.002 inches.

A fluid lubricant is applied to the bearing 10 to fill the clearance spaces 26, 28, and 30. The fluid lubricant may, for example, be formed of an oil.

The hydrodynamic bearing 10 illustrated in the figure further includes an axially-extending passageway 32 and a radially-extending passageway 34. The axially-extending passageway 32 is arranged about a circumference of the sleeve 12 and the inner portion 14 thereof, and the radially-extending passageway 34 is arranged about a circumference of the sleeve 12. The passageways 32 and 34 provide for pressure equalization between the clearance spaces.

Because relative rotation must be permitted between the outer sleeve 12 and the shaft 16/thrust plates 18 and 20, dynamic seals are required to be formed at the clearance spaces 26 to prevent leakage of lubricant fluid positioned in the clearance spaces. In the embodiment illustrated in the figure, the dynamic seals are formed by surface tension capillary seals. The capillary seals are formed by a balance between the surface tension of the fluid lubricant which fills the clearance spaces 26, 28, and 30, by a balance between the relative ambient air pressure and pressure of the fluid lubricant, and by the dimensions of the clearance space 26. The formation and function of such dynamic seals are discussed in greater detail in the aforementioned patents.

Once assembly of the bearing 10 is completed, the fluid lubricant must be applied to the clearance spaces 26, 28, and 30. As the clearance spaces 26, 28, and 30 are in fluid communication with one another and to the exterior of the bearing 10, the fluid lubricant can be poured, or otherwise applied into the bearing to fill the clearance spaces and to form the dynamic seal at the clearance space 26. As mentioned previously, as the fluid lubricant is applied to the bearing, pockets of air or other gas can become trapped within the bearing, such as at the clearance spaces 28 or 30. As noted previously, for purposes of simplicity, the term "air" shall refer to any gaseous media. Large air pockets can not be present during operation of the bearing; otherwise, heat energy generated during operation of the bearing can cause the air pockets to expand, thereby breaking the dynamic seal formed at the clearance spaces 26 and thereby causing discharge of the fluid lubricant thereout.

Figure 2:
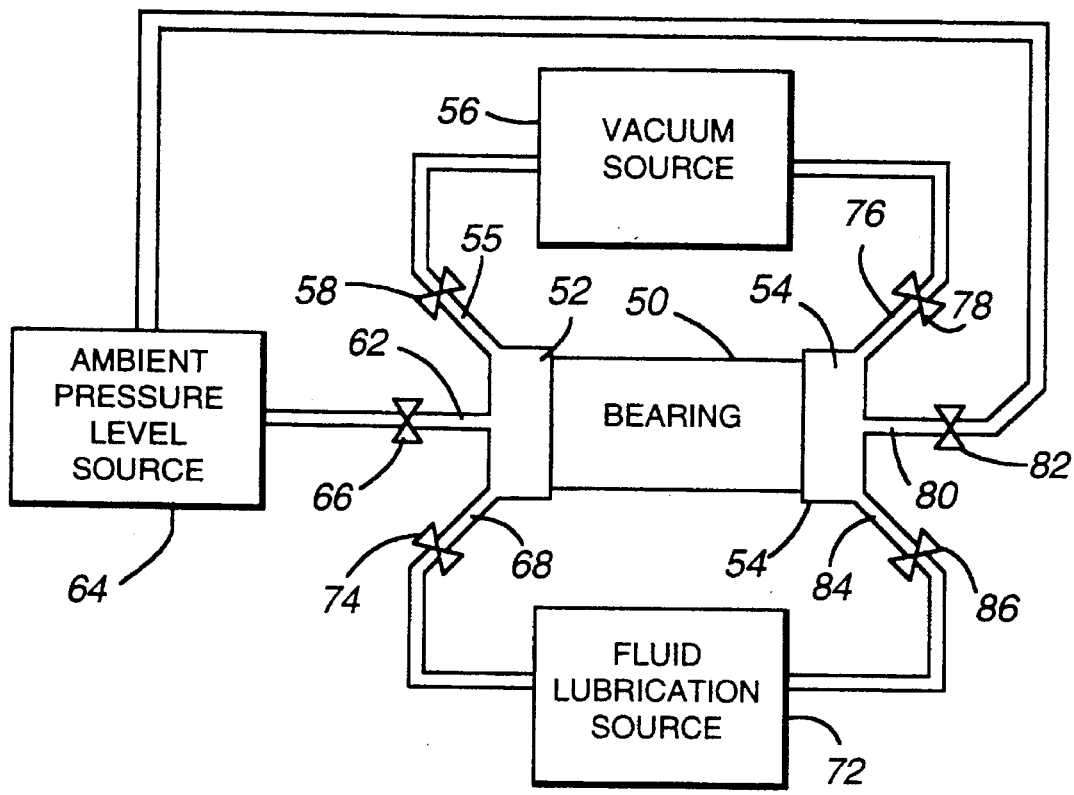
FIG. 2 is a partial functional block, partial schematic diagram of an apparatus of an embodiment of the present invention positioned together with a hydrodynamic bearing to apply a fluid lubricant to the bearing.

FIG. 2 illustrates a bearing, here shown generally at 50, to which a first cap member 52 and a second cap member 54 are attached. The first cap member 52 is positioned about a first axial side portion of the bearing 50 and the second cap member 54 is positioned about a second axial side portion of the bearing. The cap members 52 and 54, when positioned about the respective side portions of the bearing 50, function to isolate clearance spaces of the bearing 50 corresponding to the clearance spaces 26, 28, and 30 of the bearing 10 shown in FIG. 1.

A first fluid line 55 extends beyond the body of the cap member 52 and extends to a vacuum source 56 by way of a valve member 58. A second fluid line 62 also extends beyond the body of the cap member 52 and extends to an ambient, or, alternately, a controlled, pressure level source 64 by way of a valve member 66. The ambient pressure level source 64 may be an atmospheric pressure level source wherein the valve 66 vents to the atmosphere when in the open position. A third fluid line 68 further extends beyond the body of the member 52 and extends to a fluid lubrication source 72 by way of a valve member 74.

The cap member 54 similarly includes a first fluid line, here fluid line 76 extending to the vacuum pressure source 56 by way of a valve member 78, a second fluid line, here fluid line 80 extending to the ambient pressure level source 64 by way of a valve 82 and a third fluid line, here fluid line 84, extending to the fluid lubrication source 72 by way of a valve 86.

It should be noted that, while FIG. 2 illustrates the second cap member 54 to include fluid lines extending therefrom, in other embodiments, the second cap member 54 is utilized merely to isolate one of the axial side portions of the bearing 50 and does not include fluid lines extending to the sources 56, 64 and 72.

When fluid lubricant is to be applied to the bearing 50, the cap members 52 and 54 are positioned at the opposing axial sides of the bearing as illustrated in the figure. When positioned as illustrated, the clearance spaces of the bearing are isolated by the cap members.

Then, the valves 58 and 78 coupled to the vacuum pressure source 56 are opened, thereby to reduce the pressure levels of the clearance spaces within the bearing 50 down to the pressure levels of the vacuum pressure source 56. That is to say, the clearance spaces are evacuated.

Once the pressure levels of the clearance spaces have been reduced, the valves 58 and 78 are closed, and the valves 74 and 86 are opened, and fluid lubricant is applied to the clearance spaces to fill the clearance spaces. In one embodiment, the fluid lubricant is maintained under pressure to facilitate its application to the bearing. As the fluid lubricant is applied to both of the axial side portions of the bearing in the embodiment illustrated in the figure, filling of the clearance spaces of the bearing with the fluid lubricant is facilitated as fluid is pulled into the bearing at both axial sides thereof.

In one embodiment of the present invention, the fluid lubricant is heated to an elevated temperature, or maintained at an elevated temperature, prior to application to the clearance spaces. At increased temperatures, the viscosity of the fluid lubricant is altered, to facilitate its application to the clearance spaces.

Once the clearance spaces of the bearing 50 have been filled, the valves 74 and 86 and the are closed. The valves 66 and 82 are opened and the bearing is returned to ambient pressure levels. Any pockets of air in the bearing are collapsed into a very small volume. During subsequent operation of the bearing, problems associated with expansion of air is minimal as only small-volume pockets of air, if at all, remain in the bearing.

In such manner, the fluid lubricant is applied to the clearance spaces of the bearing 50 and any pockets of air trapped in the bearing are collapsed into a small volume.

Once the application of the fluid lubricant to the clearance spaces of the bearing 50 has been completed and the clearance spaces have been returned to ambient pressure levels, the cap members 52 and 54 can be removed from the bearing 50, and the process can be repeated to fill the clearance spaces of another bearing with the fluid lubricant in similar manner.

Figure 3:
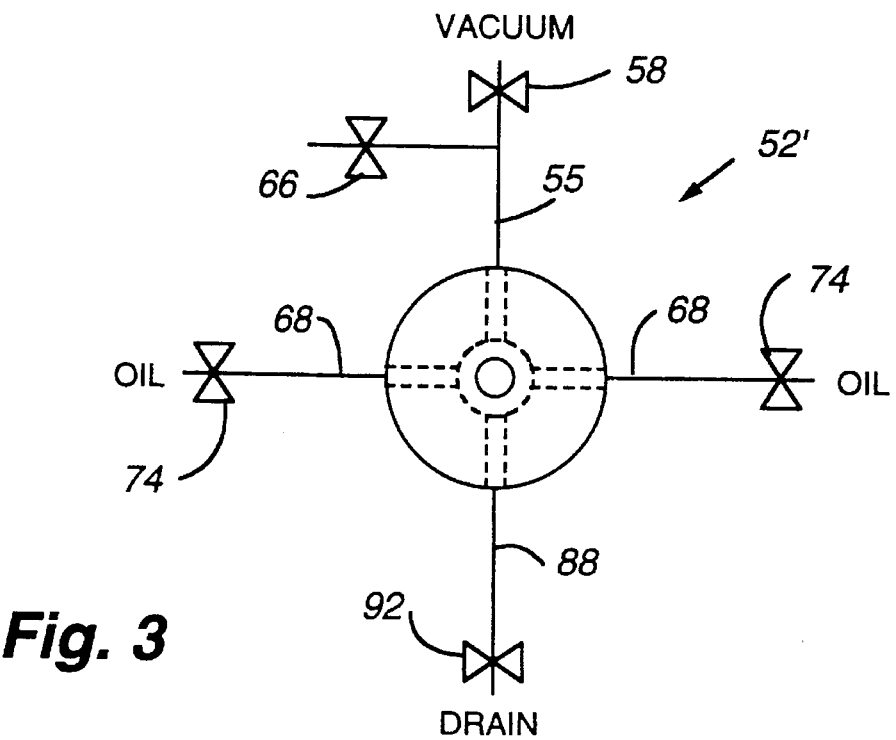
FIG. 3 is an end view of an alternate embodiment of the present invention taken from a first end thereof.

FIG. 3 illustrates a cap member, here shown generally at 52', of an alternate embodiment of the present invention. The cap member 52' includes a single fluid line 55 extending both to a vacuum source by way of a valve 58 and to an ambient pressure level source by way of a valve 66. The valves 58 and 66 can be alternately opened, or both valves can be in the closed positions. The cap member 52' also includes two fluid lines 68 and two valve members 74 extending to fluid lubricant sources. The valve members 58, 66, and 74 are opened and closed in manners analogous to the manners in which the valve members of the cap member 52 illustrated in FIG. 2 are opened and closed to apply the fluid lubricant to a hydrodynamic bearing.

The cap member 52' further includes an additional fluid line 88 extending to a drain valve 92. The drain valve 92 is opened after the fluid lubricant is applied to a bearing to fill the clearance spaces in a manner similar to that described previously. Any excess lubricant applied to the bearing during filling of the bearing by the fluid filling procedures is drained by way of the fluid line 88 once the valve 92 is opened.

Figure 4:
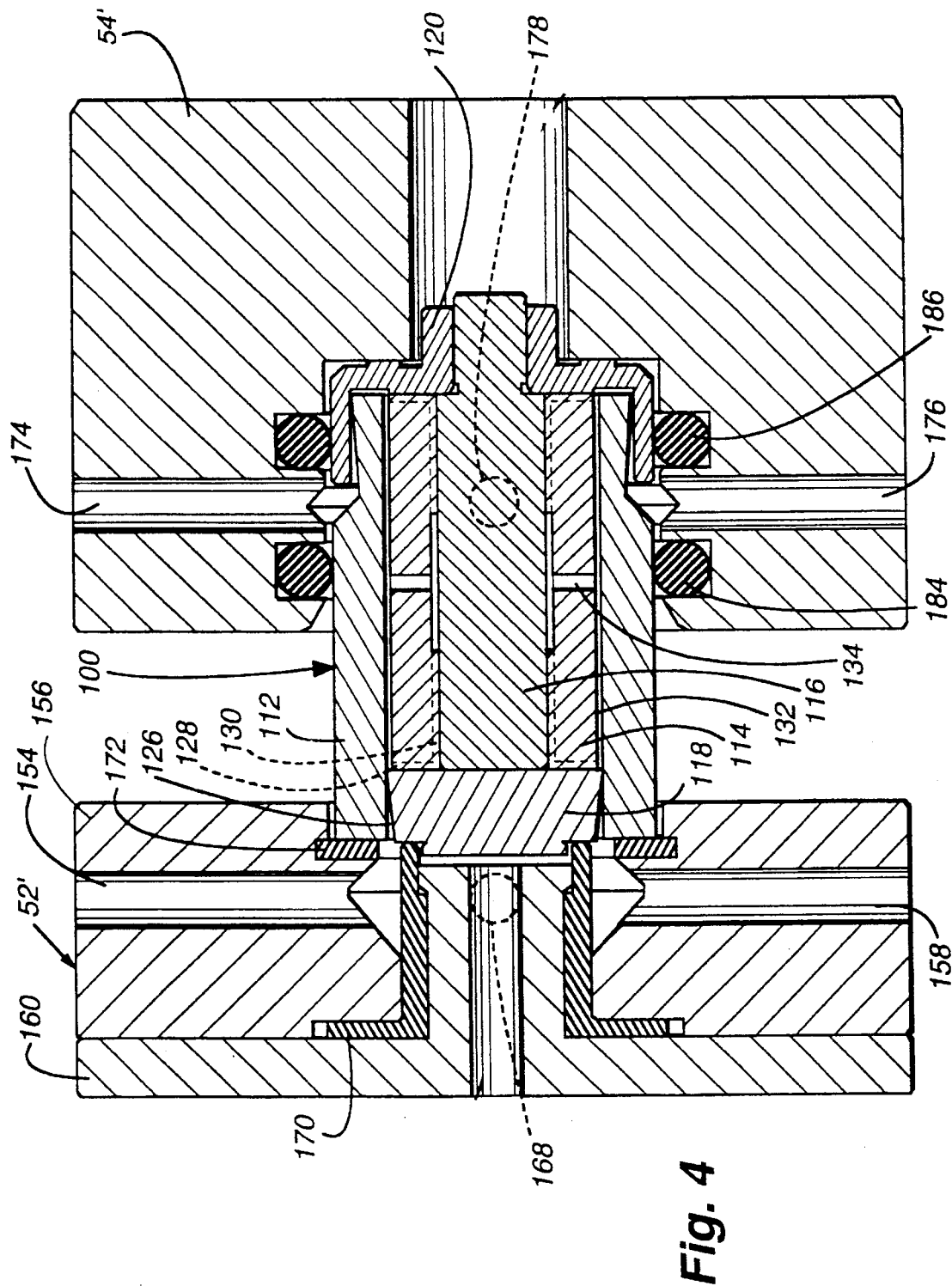
FIG. 4 is a longitudinal, sectional view of the apparatus of an embodiment of the present invention positioned together with a hydrodynamic bearing to apply fluid lubricant to the bearing.

FIG. 4 illustrates a hydrodynamic bearing, here shown generally at 100, about which a first cap member 52' and a second cap member 54' are positioned to apply a fluid lubricant to the bearing. Analogous to the bearing 50 illustrated in FIG. 1, the bearing 100 includes an outer sleeve 112, an inner sleeve 114, and a shaft 116. Thrust plates 118 and 120 are positioned at opposing sides of the shaft 116 and are affixed thereto. Clearance spaces 126, 128, and 130, are formed between the outer sleeve 112 and the shaft 116 and thrust plate 118 and 120 combination. And, axially-extending and radially-extending passageways 132 and 134, respectively, all form portions of the bearing 100 and are operable in manners analogous to operation of corresponding structure of the bearing 10 illustrated in FIG. 1.

The cap member 52' illustrated in FIG. 4 includes a first ring member 156 having radially-extending fluid and drain lines 154 and 158, respectively, formed therein. Fluid lines 168 are also formed therein. A ring member 160 seats upon the ring member 156 and includes a raised, annular central portion which is inserted through a corresponding aperture formed through the ring member 156. An elastomeric seal 170 is seated between the rings 156 and 160, and an additional elastomeric seal 172 is positioned upon a bottom face surface of the ring member 156 for seating upon the bearing 100.

The cap member 54' is positioned at a second axial side portion of the bearing 100. The cap member 54' is formed of a single cylindrical ring which includes fluid lines 174, 176, and 178 formed therein. The fluid line 174 corresponds to the fluid line 154 of the cap member 52' the fluid line 176 corresponds to the fluid line 158 of the cap member 52', and the fluid lines 178 correspond to the fluid lines 168 of the cap member 52'. Static seals, here O-rings 184 and 186, seat against outer circumferential surfaces of the bearing 100.

When fluid lubricant is to be applied to the bearing 100, the cap members 52' and 54' are positioned at opposing axial side portions of the bearing 100, in manners as illustrated. The elastomeric seal 172 and the O-rings 184 and 186 seat upon the bearing 100 and, together with other portions of the cap members, isolate the passageways and clearance spaces of the bearing 100. Analogous to manners described previously with respect to FIG. 2, the clearance spaces are evacuated by connecting the clearance spaces to a vacuum source. Once evacuated, the fluid lubricant is applied to the clearance spaces, and the clearance spaces are returned to ambient pressure levels. Then, excess lubricant is drained away from the bearing. The cap members 52' and 54' are removed out of engagement with the bearing 100, and the cap members 52' and 54' may thereafter be repositioned to permit application of the fluid lubricant to subsequent bearings.

More particularly, once the cap members 52' and 54' have been positioned about the bearing 100, the fluid lines 154 and 174 are connected to a vacuum pressure source by opening a vacuum valve (not shown in FIG. 4) connected between the fluid lines 154 and 174 and the vacuum pressure source. The clearance spaces of the bearing 100 are evacuated as the clearance spaces are in fluid communication with the vacuum pressure source by way of the cap members 52' and 54'.

Once evacuated, the vacuum valve is closed, and a fluid lubricant valve (not shown) connected between the fluid lines 168 and 178 and a fluid lubricant source is opened. Because of the pressure differential due to the evacuation of the clearance spaces, the fluid lubricant is "pressurized" or "pushed" into the clearance spaces.

Then, a vent valve (not shown in FIG. 4) connected between the fluid lines 154 and 174 and an ambient pressure level source (e.g., the atmosphere) is opened. Any pockets of air in the bearing are collapsed as the fluid lubricant is applied to the clearance spaces and the clearance spaces are returned to ambient pressure levels.

The fluid lubricant valve can alternately be opened concurrent with, or before, the opening of the vent valve.

The vacuum vent valves are then closed and a drain valve (not shown in FIG. 4), connected between the lines 158 and 176, is opened to drain any excess lubricant away from the bearing. The drain valve is then closed, and the cap members are removed from the bearing.

It should further be noted that, while FIGS. 2–4 illustrate application of fluid lubricant to only a single bearing, the fluid lubricant can be applied to multiple numbers of bearings concurrently by affixing cap members to the multiple numbers of bearings and applying the fluid lubricant to the bearings in manners described above. The plurality of cap members can, for instance, be coupled to common valve members to cause the fluid lubricant to be applied to the bearings concurrently.

Figure 5:
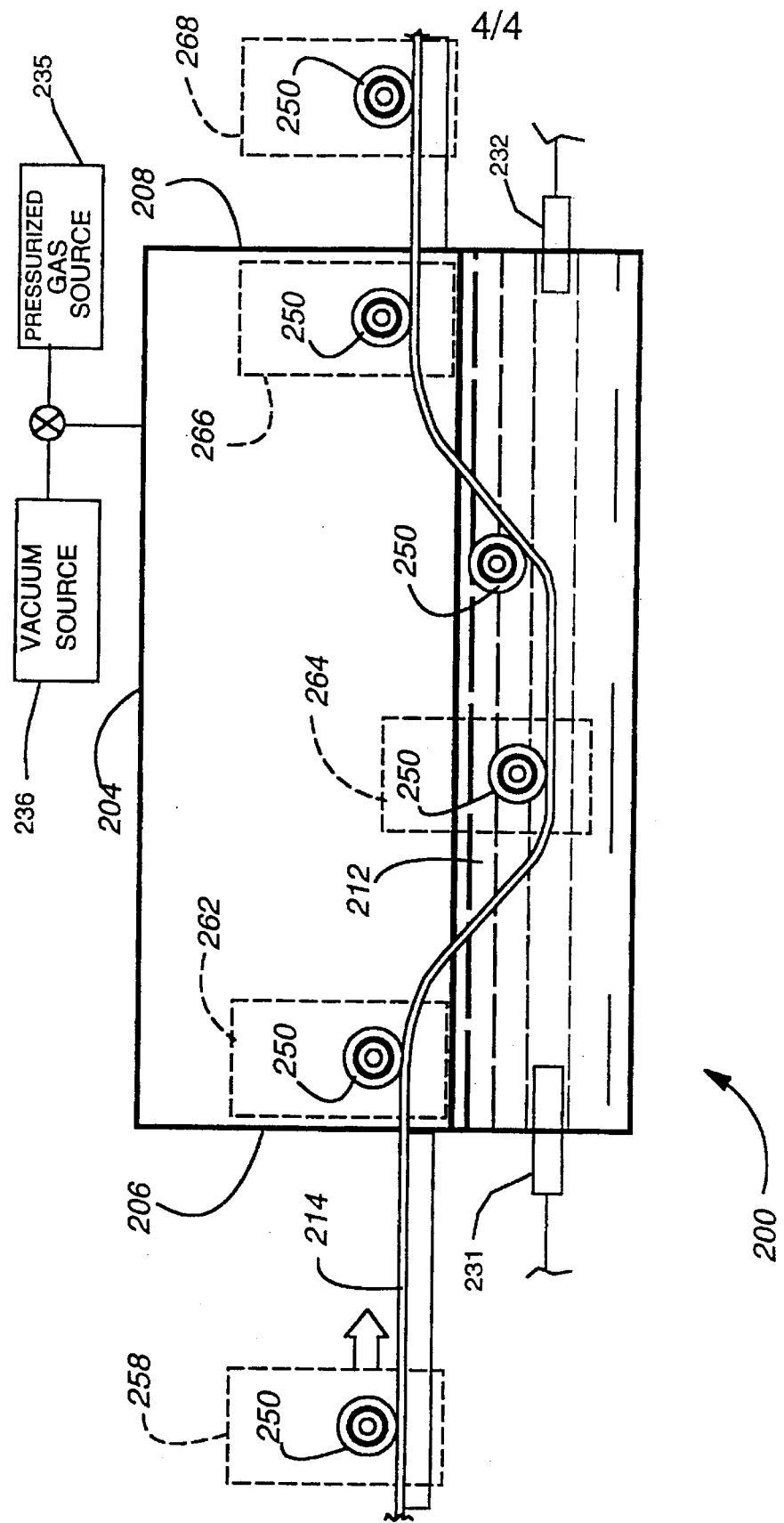
FIG. 5 illustrates another alternate embodiment of the present invention for applying a fluid lubricant to a hydrodynamic bearing.

FIG. 5 illustrates apparatus, shown generally at 200, of an alternate embodiment of the present invention by which fluid lubricant is applied to a bearing to fill the clearance spaces of the bearing. The apparatus 200 includes a vacuum tank 204 having an entry end 206 and an exit end 208. Fluid lubricant 212 is pooled in the vacuum tank 204. A conveyor 214 extends through the entry end of the vacuum tank, along the pool of fluid lubricant, and out the exit end 208 of the vacuum tank. The conveyor 214 conveys bearings, similar to the bearings 10, 50, and 100 shown in preceding figures, therealong.

A bearing, here bearing 250, is initially positioned upon the conveyor 214, prior to entry into the vacuum tank 204, indicated in the figure by a first position, represented by the block 258, shown in dash. The conveyor 214 conveys the bearing 250 into the vacuum tank 204 to be positioned at a second position within the tank 204, represented by the block 262, shown in dash. Once the bearing 250 is positioned within the vacuum tank 204, the vacuum tank is evacuated, by a vacuum source 236 to reduce pressure levels of the tank.

In the embodiment illustrated in the figure, the bearing 250 is positioned upon the conveyor 214 such that the longitudinal axis of the bearing extends horizontally. In another embodiment, the bearing is positioned such that the longitudinal axis extends in a vertical direction. And, in another embodiment, the bearing is supported upon the conveyor, or the conveyor is appropriately ramped, such that, the longitudinal axis extends at an angle between the horizontal and vertical directions.

The conveyor 214 then conveys the bearing 250 into a third position into the pool 212 of the fluid lubricant. The third position is represented by the block 264, shown in dash in the figure. When immersed in the fluid lubricant, the fluid lubricant partially fills the clearance spaces of the bearing 250 by filling the large seal areas and ports of the bearing.

The fluid lubricant, in one embodiment, is maintained at an elevated temperature to improve the viscosity characteristics of the lubricant. Heating elements 231 and 232 may, for example, be positioned within the vacuum tank 204 to generate heat energy to heat the fluid lubricant, or the fluid lubricant may be heated prior to positioning within the vacuum tank 204.

The vacuum tank is vented to the ambient pressure level, or the pressure level is otherwise increased relative to the evacuated pressure levels, when the bearing is conveyed into the third position, represented by the block 265. For instance, a tank of pressurized gas 235 may be connected to the vacuum tank, and the pressurized gas may be applied to the tank to increase the pressure thereof. During this repressurization of the tank, remaining portions of the clearance spaces become filled with the fluid lubricant.

Thereafter, the conveyor 214 conveys the bearing 250 to a fourth position, represented by the block 266, shown in dash.

In a further embodiment, the conveyor 214 is preferably ramped in more than one orientation to alter the orientation of the bearing 250 as the bearing is conveyed therealong after immersion of the bearing in the fluid lubricant. Altering the orientation of the bearing, facilitates release of pockets of air trapped in the bearing.

Then, the conveyor 214 conveys the bearing to a fifth position, represented by the block 268, shown in dash, beyond the vacuum tank 204.

It should further be noted that the apparatus 200 shown in the figure permits multiple numbers of bearings 250 to be conveyed along the conveyor and inserted into the vacuum tank 204 concurrently. Thereby, multiple numbers of bearings 250 can be filled with fluid lubricant concurrently.

The various embodiments of the present invention permit fluid lubricants to be applied to a hydrodynamic bearing which minimizes problems associated with air trapped in the bearing during application of the fluid lubricant to the bearing. The bearing is surrounded with fluid lubricant, either by bringing the bearing into a bath of the lubricant or by bringing the lubricant into the bearing. Other problems, such as cavitation of the bearing parts, associated with pockets of air retained in the bearing are additionally avoided. Fluid lubricant can be applied to large numbers of bearings in a short period of time and is amenable to an assembly line-like process. The present invention can further be advantageously utilized to apply the fluid lubricant to any of many various constructions of hydrodynamic bearings, including the exemplary bearing shown in FIG. 1 herein. Use of the present invention to apply fluid lubricant to other constructions of hydrodynamic bearings can, of course, be similarly effectuated.

Presently-preferred embodiments of the present invention have been described with a degree of particularity. The previous descriptions are of preferred examples for implementing the invention, and the scope of the invention should not necessarily be limited by this description. The scope of the present invention is defined by the following claims.

What is claimed is:

1. An apparatus for applying a fluid lubricant to a hydrodynamic bearing having clearance spaces separating bearing parts of the bearing and having at least one pathway extending between an external surface of the bearing and the clearance spaces, said apparatus comprising:

a vacuum tank, said vacuum tank having a pressure level adjustable between an ambient pressure level and an evacuated pressure level;

a pool of the fluid lubricant supported in the tank; and a conveyer for conveying the bearing into said vacuum tank, through said pool of the fluid lubricant, beyond said pool, and out of said vacuum tank.

2. The apparatus of claim 1 wherein the vacuum tank includes heating elements for heating the fluid lubricant.

3. The apparatus of claim 1 wherein the vacuum tank includes at least one inlet for releasing pressurized gas into the tank and adjusting the pressure level.

4. The apparatus of claim 1 wherein the conveyer includes at least two ramp portions for conveying the bearing into and out of the fluid lubricant.

5. The apparatus of claim 1 wherein the bearing is positioned upon the conveyer such that a longitudinal axis of the bearing extends perpendicular against a direction of conveyor travel.

6. The apparatus of claim 1 wherein the bearing is positioned upon the conveyer such that the longitudinal axis of the bearing extends parallel with the direction of conveyor travel.

7. The apparatus of claim 2 wherein the heating elements maintain the fluid lubricant at a heated temperature.

8. An apparatus for applying a fluid lubricant to a plurality of hydrodynamic bearings, each having clearance spaces separating bearing parts therein and having at least one pathway extending between an external surface of each bearing and the clearance spaces, said apparatus comprising:

a tank exhibiting a pressure level adjustable between an ambient pressure level, an evacuated pressure level, and an elevated pressure level;

a pool of the fluid lubricant supported in the tank, the pool of fluid lubricant having a volume sufficient to apply the fluid lubricant to the plurality of hydrodynamic bearings; and a conveyer for concurrently conveying the bearings into the tank, through the pool of the fluid lubricant, beyond the pool, and out of the tank.

9. The apparatus of claim 8 wherein the tank includes heating elements for heating the fluid lubricant.

10. The apparatus of claim 8 wherein the tank includes at least one inlet for releasing pressurized gas into the tank and adjusting the pressure level.

11. The apparatus of claim 8 wherein the conveyer includes at least two ramp portions for conveying the bearings into and out of the fluid lubricant at different orientations in order to facilitate filling the clearance spaces with the fluid lubricant.

12. A method of introducing a fluid lubricant to a plurality of hydrodynamic bearings, each having clearance spaces separating bearing parts therein and having at least one pathway extending between an external surface of each bearing and the clearance spaces, the method comprising the steps of:

placing the bearings on a conveyor for conveying the bearings into a tank containing a pool of the fluid lubricant;

evacuating an air pressure inside the tank from an ambient pressure level to an evacuated pressure level;

conveying the bearings into the pool of fluid lubricant to introduce the fluid lubricant into the clearance spaces;

increasing the pressure level inside the tank to an elevated pressure level to further introduce the fluid lubricant into the clearance spaces of the bearings;

returning the pressure level inside the tank to the ambient pressure level; and conveying the bearings out of the pool of fluid lubricant and out of the tank.

13. The method of claim 12 wherein the step of conveying the bearings into and out of the pool of fluid lubricant comprises orienting the conveyor into at least two ramp portions.

14. The method of claim 12 wherein the step of placing the bearings on the conveyor comprises positioning the bearings such that a longitudinal axis of each bearing extends horizontally relative to the direction of conveying.

15. The method of claim 12 wherein the step of placing the bearings on the conveyor comprises positioning the bearings such that the longitudinal axis of each bearing extends vertically relative to the direction of conveying.

16. The method of claim 12 wherein the step of placing the bearings on the conveyor comprises positioning the bearings such that the longitudinal axis of each bearing extends at an angle relative to the direction of conveying.

* * * * *